US010363893B2

(12) United States Patent
Gordon et al.

(10) Patent No.: US 10,363,893 B2
(45) Date of Patent: Jul. 30, 2019

(54) SELF-DRIVING VEHICLE CONTEXTUAL LOCK CONTROL SYSTEM

(71) Applicant: International Business Machines Corporation, Armonk, NY (US)

(72) Inventors: Michael S. Gordon, Yorktown Heights, NY (US); Stacy F. Hobson, Poughkeepsie, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/398,885

(22) Filed: Jan. 5, 2017

(65) Prior Publication Data
US 2018/0187460 A1    Jul. 5, 2018

(51) Int. Cl.
*B60R 21/0136* (2006.01)
*E05B 81/00* (2014.01)
*G07C 9/00* (2006.01)
*E05B 81/78* (2014.01)

(52) U.S. Cl.
CPC .......... *B60R 21/0136* (2013.01); *E05B 81/01* (2013.01); *G07C 9/00* (2013.01); *E05B 81/78* (2013.01)

(58) Field of Classification Search
CPC ...... B60R 21/0136; E05B 81/01; E05B 81/78
See application file for complete search history.

(56) References Cited

U.S. PATENT DOCUMENTS

| 4,665,395 | A  |   | 5/1987  | Van Ness        |
| 4,908,988 | A  |   | 3/1990  | Yamamura et al. |
| 5,975,791 | A  |   | 11/1999 | McCulloch       |
| 6,064,970 | A  |   | 5/2000  | McMillian et al.|
| 6,201,318 | B1 |   | 3/2001  | Guillory        |
| 6,326,903 | B1 |   | 12/2001 | Gross et al.    |

(Continued)

FOREIGN PATENT DOCUMENTS

| CA | 2447554 A1 | * | 11/2000 |
| CN | 1135063    |   | 11/1996 |

(Continued)

OTHER PUBLICATIONS

R. Vaidyanathan et al., "A Reflexive Vehicle Control Architecture Based on a Neural Model of the Cockroach Escape Response", Institution of Mechanical Engineers. Journal of Systems and Control Engineering, 2011, vol. 226, No. 5, pp. 699-718.

(Continued)

*Primary Examiner* — Jelani A Smith
*Assistant Examiner* — Kelly D Williams
(74) *Attorney, Agent, or Firm* — Law Office of Jim Boice

(57) ABSTRACT

A computer-implemented method selectively controls locks on a self-driving vehicle. One or more processors receive sensor readings from sensors on a self-driving vehicle (SDV) that describe a vehicle context assessment of the SDV and a passenger context assessment of a passenger in the SDV. One or more processors transmit a signal to a lock controller mechanism on the SDV to selectively lock and unlock a lock in the SDV based on the vehicle context assessment and the passenger context assessment.

19 Claims, 7 Drawing Sheets

(56) References Cited

U.S. PATENT DOCUMENTS

| | | |
|---|---|---|
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,892,451 B2 | 11/2014 | Everett |
| 8,903,591 B1 | 12/2014 | Ferguson et al. |
| 8,923,890 B1 | 12/2014 | White et al. |
| 8,935,034 B1 | 1/2015 | Zhu |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,317,033 B2 | 4/2016 | Ibanez-guzman et al. |
| 9,381,915 B1 | 7/2016 | Crombez et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,552,735 B2 | 1/2017 | Pilutti et al. |
| 9,566,958 B2 | 2/2017 | Waldmann |
| 9,566,986 B1 | 2/2017 | Gordon et al. |
| 9,587,952 B1 | 3/2017 | Slusar |
| 9,628,975 B1 | 4/2017 | Watkins et al. |
| 9,646,496 B1 | 5/2017 | Miller |
| 9,718,468 B2 | 8/2017 | Barfield et al. |
| 9,754,235 B1 | 9/2017 | Konrardy |
| 9,834,224 B2 | 12/2017 | Gordon et al. |
| 9,944,291 B2 | 4/2018 | Gordon |
| 10,042,359 B1 | 8/2018 | Konrardy |
| 10,093,322 B2 | 10/2018 | Gordon |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0117086 A1 | 6/2004 | Rao et al. |
| 2004/0199306 A1 | 10/2004 | Helmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Yuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 | 11/2008 | Seguin et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0083960 A1 | 4/2012 | Zhu |
| 2012/0123646 A1 | 5/2012 | Mantini |
| 2012/0139756 A1 | 6/2012 | Djurkovic |
| 2012/0277947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2013/0304514 A1 | 11/2013 | Hyde |
| 2014/0019259 A1 | 1/2014 | Dung et al. |
| 2014/0032049 A1 | 1/2014 | Moshchuk et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |

(56) References Cited

U.S. PATENT DOCUMENTS

| | | |
|---|---|---|
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0097866 A1 | 4/2015 | Mochizuki |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0170287 A1 | 6/2015 | Tirone |
| 2015/0187019 A1 | 7/2015 | Fernandes |
| 2015/0196256 A1 | 7/2015 | Venkatraman et al. |
| 2015/0210280 A1 | 7/2015 | Agnew et al. |
| 2015/0232065 A1 | 8/2015 | Ricci et al. |
| 2015/0235480 A1 | 8/2015 | Cudak |
| 2015/0235557 A1 | 8/2015 | Engelman |
| 2015/0242953 A1 | 8/2015 | Suiter |
| 2015/0269536 A1 | 9/2015 | Parris |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0063761 A1 | 3/2016 | Sisbot et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0202700 A1 | 7/2016 | Sprigg |
| 2016/0205146 A1 | 7/2016 | Sugioka et al. |
| 2016/0221768 A1 | 8/2016 | Kadaba |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1 | 12/2016 | Ansari |
| 2016/0364823 A1 | 12/2016 | Cao |
| 2016/0368534 A1 | 12/2016 | Harda |
| 2016/0371977 A1 | 12/2016 | Wingate |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0032585 A1 | 2/2017 | Stenneth |
| 2017/0057542 A1 | 3/2017 | Kim et al. |
| 2017/0061798 A1 | 3/2017 | Linder |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129335 A1* | 5/2017 | Lu .................. G16H 70/00 |
| 2017/0129487 A1 | 5/2017 | Wulf |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0219364 A1 | 8/2017 | Lathrop |
| 2017/0248949 A1 | 8/2017 | Moran et al. |
| 2017/0300855 A1 | 10/2017 | Lund |
| 2018/0032071 A1 | 2/2018 | Wieneke |
| 2018/0072323 A1 | 3/2018 | Gordon |
| 2018/0075309 A1 | 3/2018 | Sathyanarayana et al. |
| 2018/0086373 A1 | 3/2018 | Tamura |
| 2018/0093631 A1 | 4/2018 | Lee et al. |
| 2018/0108369 A1* | 4/2018 | Gross .................. B60R 25/1001 |
| 2018/0141453 A1 | 5/2018 | High |
| 2018/0154906 A1 | 6/2018 | Dudar |
| 2018/0203455 A1 | 7/2018 | Cronin |
| 2018/0265054 A1 | 9/2018 | Hofmann |
| 2018/0371805 A1* | 12/2018 | Ichinose .................. E05B 77/12 |

FOREIGN PATENT DOCUMENTS

| | | |
|---|---|---|
| CN | 2349068 Y | 11/1999 |
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| GB | 2498793 A | 7/2013 |
| WO | 2014058263 | 4/2014 |
| WO | 2014066721 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |

OTHER PUBLICATIONS

Anonymous, 'System and Method to Target Advertisements for the Right Focus Group'. ip.com, No. 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", The Energy Collective, theenergycollective.com, Aug. 19, 2014, pp. 1-7.

Chen S, et al., "A Crash Risk Assessment Model for Roas Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilities", ip.com, Jun. 6, 2014, pp. 1-5. ip.com.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

C. Berger et al., "Cots-Architecture With a Real-Time OS for a Self-Driving Miniature Vehicle", Safecomp 2013—Workshop ASCOMS

(56) References Cited

OTHER PUBLICATIONS of the 32nd International Conference on Computer Safety, Reliability and Security, Sep. 2013, Toulouse, France, pp. 1-13.

Stern, Marc. "Does Locking Your Car Doors Keep You Safer in an Accident?" yourmechanic.com, Dec. 3, 2015. Web. Sep. 22, 2016. <https://www.yourmechanic.com/article/does-locking-your-car-doors-keep-you-safer-in-an-accident>.

Singh et al. "FPGA Based Autonomous Vehicle Locking System—A Smart Door Lock". ACEEE, International Journal of Recent Trends in Engineerings, vol. 2, No. 4, Nov. 2009, pp. 65-67.

Anonymous, "Google Files Patent for Second-Gen Autonomous Vehicle Without a Steering Jvheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

Anonymous, "Avoiding Crashes With Self-Driving Cars: Today's Crash-Avoidance Systems are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

P. Mell et al., "The NIST Definition of Cloud Computing", National Institute of Standards and Technology, Information Technology Laboratory, Sep. 2011, pp. 1-7.

\* cited by examiner

SELF-DRIVING VEHICLE CONTEXTUAL LOCK CONTROL SYSTEM

BACKGROUND

The present disclosure relates to the field of vehicles, and specifically to the field of self-driving vehicles. Still more specifically, the present disclosure relates to the field of managing the locking and unlocking of doors on self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A computer-implemented method selectively controls locks on a self-driving vehicle. One or more processors receive sensor readings from sensors on a self-driving vehicle (SDV) that describe a vehicle context assessment of the SDV and a passenger context assessment of a passenger in the SDV. One or more processors transmit a signal to a lock controller mechanism on the SDV to selectively lock and unlock a lock in the SDV based on the vehicle context assessment and the passenger context assessment.

The present invention may be implemented by a computer program product and/or a computer system.

DETAILED DESCRIPTION

Figure 1:
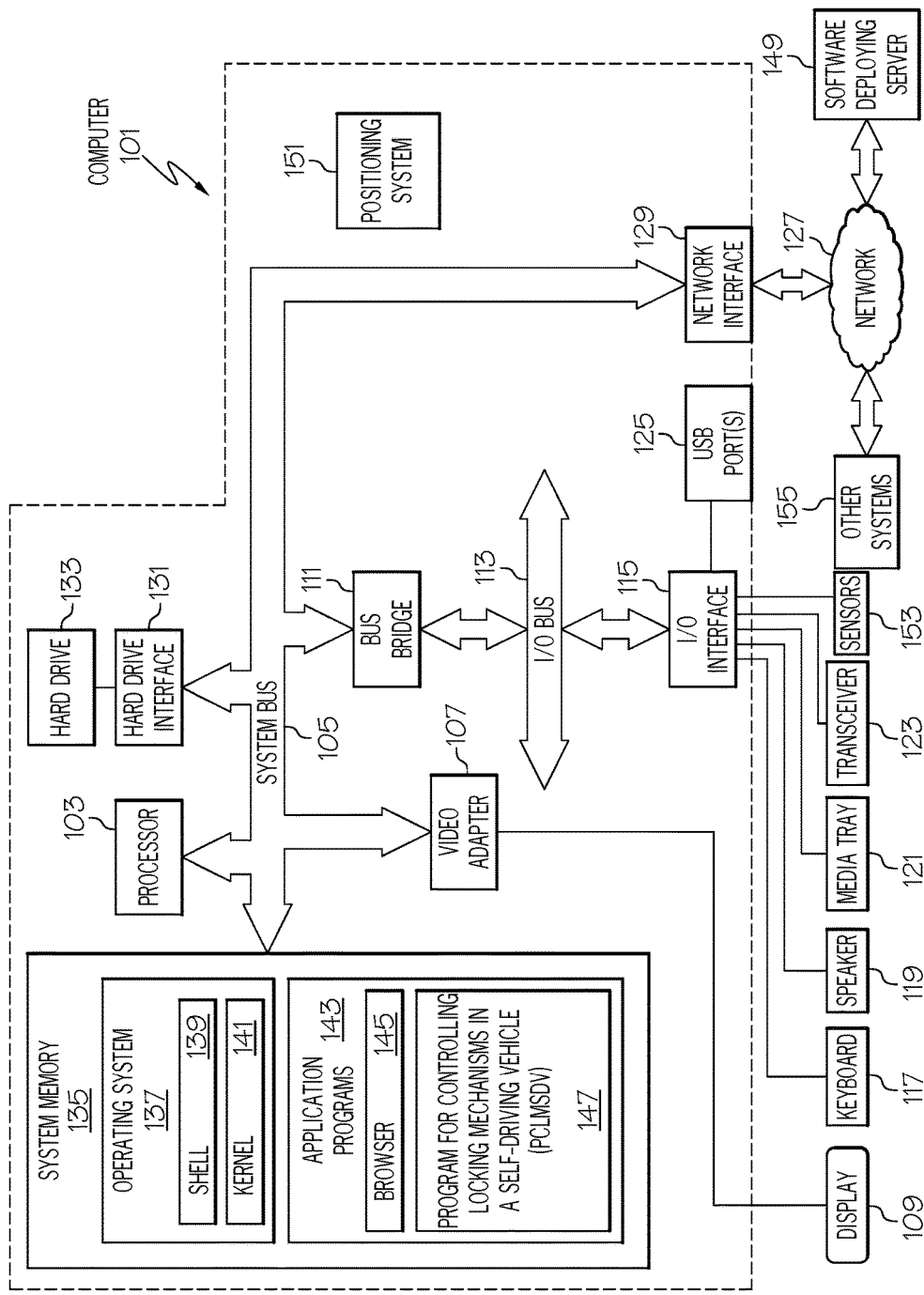
FIG. 1 depicts an exemplary system in accordance with one or more embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or monitoring system 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
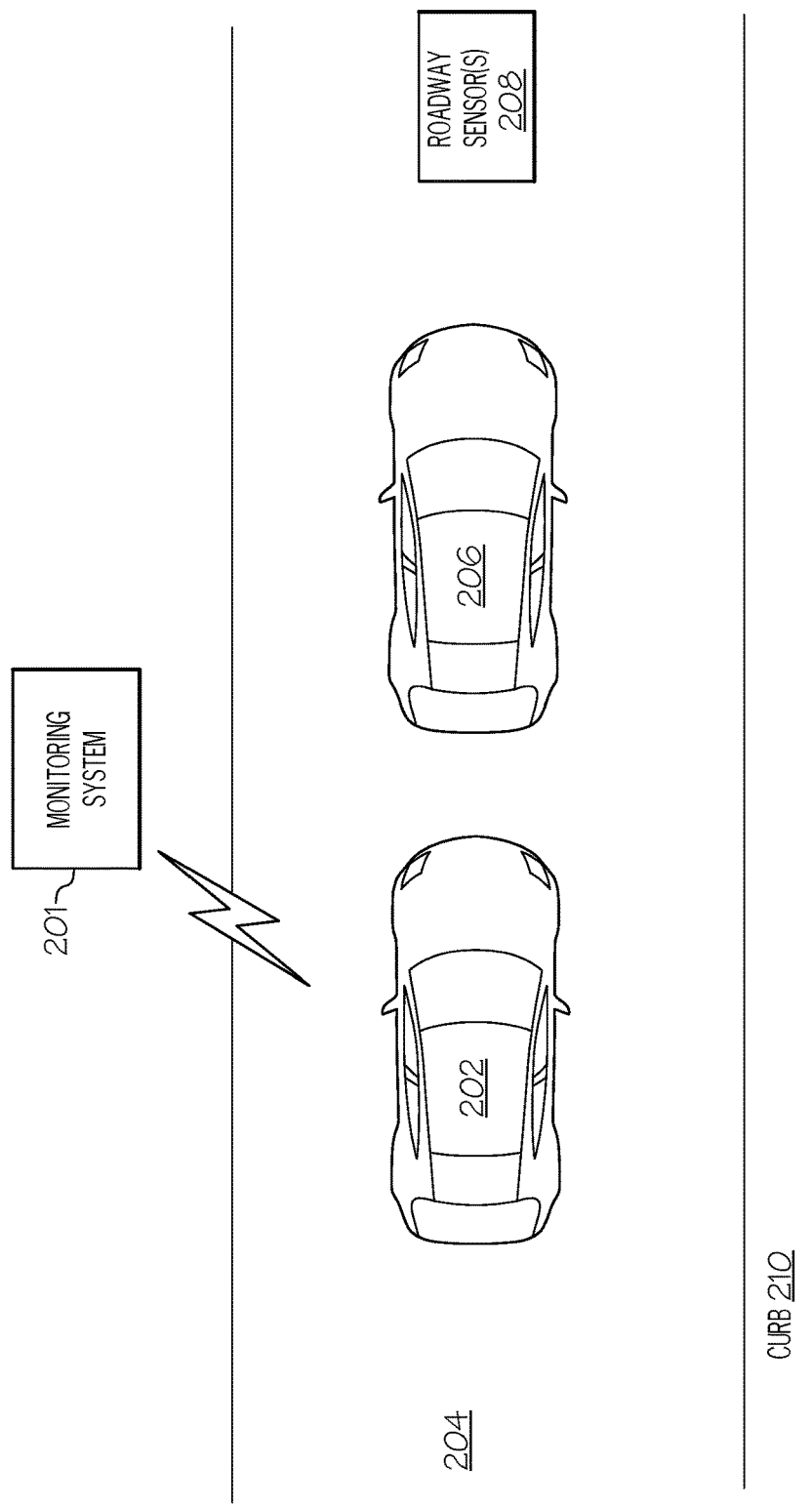
FIG. 2 illustrates an exemplary self-driving vehicle (SDV) in which one or more locks are selectively locked and/or unlocked in accordance with one or more embodiments of the present invention.

As depicted, computer 101 is able to communicate with a software deploying server 149 and/or other systems 155 (e.g., establishing communication between monitoring system 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Controlling Locking Mechanisms in a Self-Driving Vehicle (PCLMSDV) 147. PCLMSDV 147 includes code for implementing the processes described below, including those described in FIGS. 2-5. In one embodiment, computer 101 is able to download PCLMSDV 147 from software deploying server 149, including in an on-demand basis, wherein the code in PCLMSDV 147 is not downloaded until needed for execution. In one embodiment of the present invention, software deploying server 149 performs all of the functions associated with the present invention (including execution of PCLMSDV 147), thus freeing computer 101 from having to use its own internal computing resources to execute PCLMSDV 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of occupants of a self-driving vehicle (SDV). More specifically, when detecting the environment of the SDV, sensors 153 are able to detect other vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors such as chemical sensor 327 shown in FIG. 3 for detecting chemical spills on a roadway, moisture detectors, etc. that detect ambient weather conditions, traffic conditions (as detected by the cameras, microphones, etc.), and other environmental conditions of a roadway upon which the SDV is traveling. When detecting the state of occupants of the SDV, sensors 153 (e.g., biometric sensor 335 shown in FIG. 3) may be any type of device capable of detecting the state of the occupants of the SDV, including but not limited to cameras (that detect facial and body movements), microphones such as microphone 331 shown in FIG. 3 that detect vocalizations, body sounds, etc. emanating from the occupants, biometric sensors (e.g., electrocardiograph (ECG/EKG) monitors, blood pressure monitors, etc.), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used herein, the terms "occupant" and "passenger" are used interchangeably to describe animate entities within a vehicle.

With reference now to FIG. 2, an exemplary self-driving vehicle (SDV) 202 is depicted traveling along a roadway 204. In an embodiment of the present invention, a monitoring system 201 (structurally analogous to computer 101 shown in FIG. 1) is in radio communication (e.g., via a cellular phone network, local transmitters, etc.) with SDV 202, and is thus able to remotely control various mechanisms on SDV 202 (including locking and unlocking locks on SDV 202).

One or more embodiments of the present invention selectively lock and/or unlock various locks within SDV 202 according to 1) a state of the SDV 202 (based on a "vehicle context assessment" which is described herein), and 2) a state of any passenger within SDV 202 (based on a "passenger context assessment" which is described herein).

For example, if a vehicle context assessment determines that SDV 202 is about to collide with vehicle 206 (as detected by sensors on SDV 202 such as those depicted in FIG. 3), then an on-board computer within SDV 202 and/or a monitoring system 201 will electronically instruct door, trunk, and/or other locks on SDV 202 to lock, thereby improving the structural integrity of SDV 202 and reducing the likelihood of bodily damage due to items that might become airborne if a glove compartment or other interior storage compartment of the vehicle were to open.

Similarly, if a vehicle context assessment determines, based on road conditions detected by roadway sensor(s) 208 that roadway 204 is icy, snowy, wet, etc., then an on-board computer within SDV 202 and/or a monitoring system 201 will electronically instruct door, trunk, and/or other locks on SDV 202 to lock, thereby improving the structural integrity of SDV 202.

Figure 3:
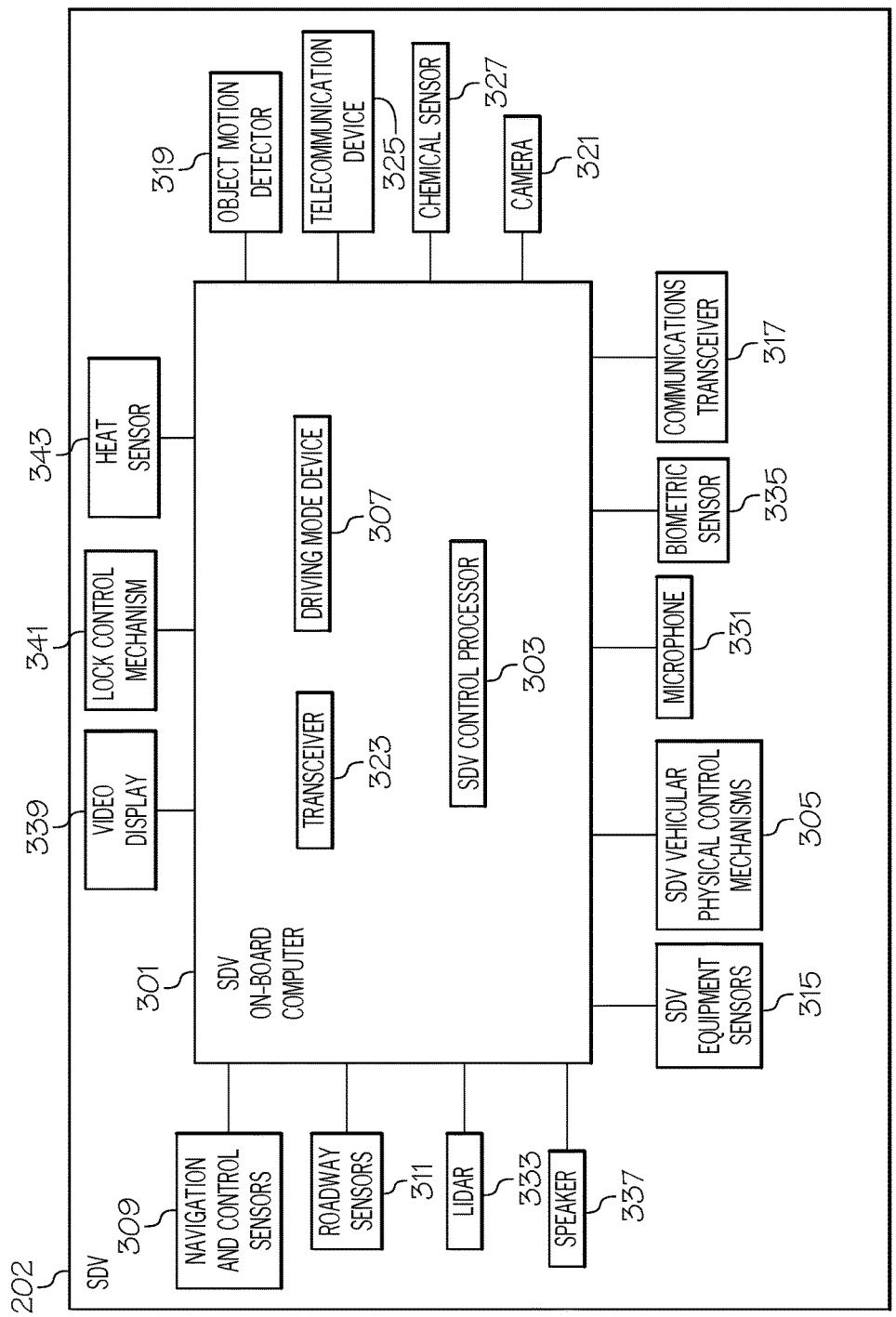
FIG. 3 depicts additional detail of the SDV illustrated in FIG. 2.

However, if SDV 202 is on fire (as detected by other sensors on SDV 202 such as those depicted in FIG. 3), then an on-board computer within SDV 202 and/or a monitoring system 201 will electronically instruct door, trunk, and/or other locks on SDV 202 to unlock, thereby allowing passengers of the SDV 202 to egress from SDV 202, first responders to access passengers within the SDV 202, etc.

Furthermore, if a vehicle context assessment determines that SDV 202 has stopped (e.g., next to curb 210) and a passenger context assessment determines that the SDV is at a predetermined destination of passengers of SDV 202, then an on-board computer within SDV 202 and/or a monitoring system 201 will electronically instruct door, trunk, and/or other locks (in one or more embodiments only on passenger doors that are adjacent to the curb 210) on SDV 202 to unlock, thereby allowing passengers of the SDV 202 to egress from SDV 202 onto curb 210.

However, if a passenger context assessment determines that a passenger of SDV 202 is of a cognitive state that makes it imperative that the passenger remain locked inside of SDV 202 while SDV 202 is moving (for his/her own safety), then an on-board computer within SDV 202 and/or a monitoring system 201 will electronically instruct door locks on SDV 202 to lock or remain locked. For example, analytics may examine the results of a video analysis of images of the passenger, in order to determine their cognitive state (anxious, etc.). Based on this analysis, the door locks will be controlled accordingly.

Similarly, windows on the SDV 202 may also be selectively opened/closed based on the state of the passenger. This state may be physical (e.g., the SDV 202 may automatically roll down windows on the SDV 202 if cabin temperatures rise above a predetermined level) or emotional (e.g., the SDV 202 may automatically roll up, roll down, lock, and/or unlock the windows based on the emotional state of the passenger, as determined by analytics of the passenger's captured video image).

With reference now to FIG. 3, additional details of one or more embodiments of the SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

Similarly, a dedicated camera 321 can be trained on roadway 204, in order to provide photographic images of conditions on the roadway 204 upon which the SDV 202 is traveling.

Similarly, a dedicated object motion detector 319 (e.g., a radar transceiver capable of detecting Doppler shifts indicative of the speed and direction of movement of other vehicles, animals, persons, etc. on the roadway 204) can be trained on the roadway 204 upon which the SDV 202 is traveling.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within SDV 202 is a speaker 337, which is able to broadcast aural warnings (e.g., a buzzer, alarm, or computer-generated voice) that apprise the occupants of the SDV 202 and/or other persons/vehicles of a state (locked/unlocked) of locks within SDV 202.

In one or more embodiments of the present invention, also within SDV 202 is a video display 339, which is able to display visual warnings (e.g., a flashing light, a text message, etc.) that apprise the occupants of the SDV 202 and/or other persons/vehicles of state (locked/unlocked) of locks within SDV 202.

In one or more embodiments of the present invention, also within SDV 202 is a lock control mechanism 341, which uses electromechanical devices to lock and unlock door locks, a trunk lock, a glove compartment lock, hood locks, etc. on SDV 202.

In one or more embodiments of the present invention, also within SDV 202 is a heat sensor 343, which is capable of detecting if there is an on-board fire or an excessive amount of cabin heat in SDV 202. That is, if SDV 202 catches fire (as detected by heat sensor 343), then the door locks will be unlocked in order to allow passengers of SDV 202 to escape. Similarly, if SDV 202 is parked with the air conditioning turned off and with passengers inside the cabin of the SDV 202, and the heat sensor 343 detects a dangerous temperature level (e.g., more than 110 degrees Fahrenheit), the SDV on-board computer 301 will cause window locks and/or door locks to unlock, so that windows can be lowered and/or doors can be opened.

Figure 4:
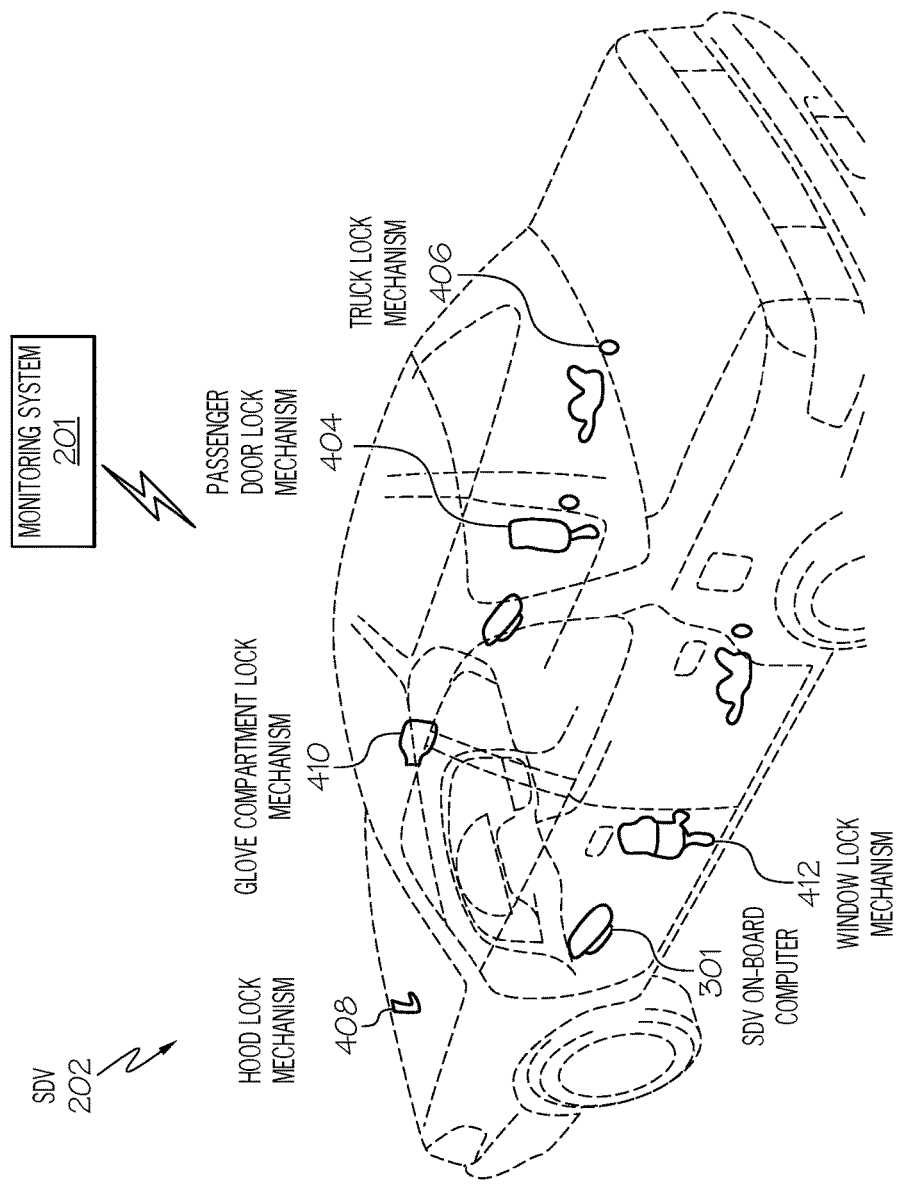
FIG. 4 illustrates various locking mechanisms with the SDV shown in FIG. 2 as used by one or more embodiments of the present invention.

For example and as shown in FIG. 4, assume that SDV 202 has the SDV on-board computer 301 shown in FIG. 3. SDV on-board computer 301 is able to control the locking and unlocking of various lock control mechanisms 341, including the depicted passenger door lock mechanism 404, the trunk lock mechanism 406, the hood lock mechanism 408, the glove compartment lock mechanism 410, and/or the window lock mechanism 412. Each of these lock mechanisms are electromechanical devices (e.g., actuators) that are controlled by signals from the SDV on-board computer 301 and/or the monitoring system 201 introduced in FIG. 2.

Figure 5:
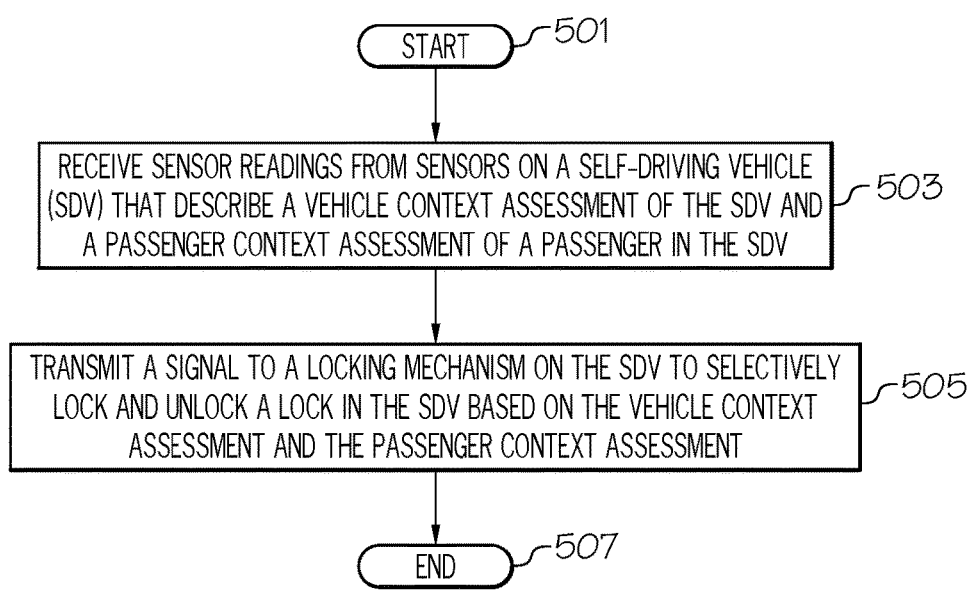
FIG. 5 is a high-level flow chart illustrating a process in accordance with one or more embodiments of the present invention.

With reference now to FIG. 5, a high-level flow chart of one or more steps performed by one or more processors and/or other hardware devices in accordance with one or more embodiments of the present invention is presented.

After initiator block 501, one or more processors (e.g., with SDV on-board computer 301 and/or monitoring system 201) receive sensor readings from sensors on a self-driving vehicle (SDV) that describe a vehicle context assessment of the SDV and a passenger context assessment of a passenger in the SDV, as described in block 503. For example, heat sensor 343 may send sensor readings to SDV on-board computer 301 indicating the presence of temperatures in excess of 400 degrees Fahrenheit, which SDV on-board computer 301 will analyze in order to create the vehicle context assessment that the SDV 202 is on fire. Similarly, microphone 331 (aimed at an interior of a cabin of SDV 202) may detect the voices of a passengers inside the SDV 202, which SDV on-board computer 301 will analyze in order to create the passenger context assessment that the passengers desire to exit the SDV 202 immediately.

As described in block 505 in FIG. 5, one or more processors will then transmit a signal to a lock controller mechanism in the SDV to selectively lock and unlock a lock in the SDV (e.g., the passenger door lock mechanism 404 shown in FIG. 4) based on the vehicle context assessment and the passenger context assessment.

The flow-chart ends at terminator block 507.

In an embodiment of the present invention, the lock controller mechanism in the SDV selectively locks and unlocks SDV components from a group consisting of one or more passenger doors on the SDV, a trunk door on the SDV, a glove compartment door in the SDV, and a hood of the SDV. (See FIG. 4.)

In an embodiment of the present invention, the passenger context assessment is based on a risk aversion profile for the passenger in the SDV. For example, assume that SDV on-board computer 301 has access to a profile database for a current passenger in the SDV. Assume further that this passenger has an extreme fear of being trapped underwater in a vehicle that has gone off a bridge. Even though the passenger will likely be safer with the doors locked, even if the SDV 202 goes into a river, in order to calm the passenger, the SDV on-board computer 301 1) will unlock the passenger door lock mechanism 404 shown in FIG. 4, and 2) will let the passenger know (via the video display 339 and/or speaker 337 inside a cabin of the SDV 202) that the doors will be unlocked only as long as the SDV 202 is on a bridge over water.

In an embodiment of the present invention, the passenger context assessment is based on a risk profile for the passenger in the SDV. For example, assume again that SDV on-board computer 301 has access to a profile database for a current passenger in the SDV. Assume further that this passenger has a high sensitivity to certain chemicals present on roadway 204, as detected by chemical sensor 327. As such, if SDV 202 is traveling through an area in which such chemicals are present, then the SDV on-board computer 301 will keep all windows and doors locked, such that the passenger is not exposed to such chemicals.

In an embodiment of the present invention, the vehicle context assessment is based on a current degree of movement and location of the SDV. For example, the vehicle context assessment, using readings from navigation and control sensors 309 shown in FIG. 3, may detect that the SDV 202 is stopped at a planned destination (e.g., has pulled up to and stopped next to curb 210 shown in FIG. 2). The vehicle context assessment may also determine that curb 210 is at the right side of SDV 202. Thus, SDV on-board computer 301 will cause only the passenger door lock mechanism 404 on the right side of SDV 202 to unlock.

In an embodiment of the present invention, the signal to the lock controller mechanism is received from a remote device that has been predetermined to be authorized to lock and unlock the locks in the SDV based on an identity and state of the passenger in the SDV. For example, assume that a security guard has a cellular device (e.g., a cellular phone). Assume further that the SDV 202 has arrived at the guard's location. By knowing the identity of the passenger, and that the passenger has an appointment at the guard's location ("state of the passenger in the SDV"), then the security guard can unlock the doors of the SDV 202 upon its arrival at the guard's location. However, other SDVs would not be allowed to have their doors unlocked at the guard's location (due to having unauthorized passengers and/or passengers who are not scheduled to visit the guard's location). Rather, the cellular device controlled by the security guard would issue a signal to the SDV on-board computer 301 on such other SDVs to keep their doors and windows locked while at the guard's location.

In an embodiment of the present invention, one or more processors detect, based on sensor readings (e.g., sensors shown in FIG. 3) that the SDV has been involved in a collision. This causes the processors (e.g., within SDV on-board computer 301) to direct the locks (e.g., the door locks) in the SDV to unlock, and to generate an audible set of directions (e.g., via speaker 337) to the passenger of the SDV for exiting the SDV. That is, in the event of an accident, the doors will unlock automatically, and a computer-generated voice instructs the passengers on the best way to exit. In one or more embodiments, the directions can be tailored to the number of passengers and/or the age of passengers in the SDV 202 and/or how they need to exit the vehicle (e.g., the door may stay open or continuously open/close, based on the surrounding context such as the danger zone of the area, etc.).

In an embodiment of the present invention, the system utilizes a "fuzzy unlock/lock" function. For example, instead of simply unlocking the doors, the SDV on-board computer 301 may direct the lock control mechanism 341 to first ask the passenger for confirmation, give a warning, etc. Once the passenger responds, then the door may fully unlock (or lock).

Thus, as described herein is a method, system, and/or computer program product for selectively locking and unlocking locks (e.g., door locks) on an SDV based on an automated advanced context assessment.

For example, the SDV may be used to transport persons to doctor's appointments, school, shopping, and the like. The present invention presents a smart door locking and unlocking system, based on a number of vehicle and passenger context factors.

The context factors may include many potential inputs, each of which may have a weight (if desired) into a simple function that controls the SDV lock/unlock modules/mechanisms. Such context may include any of: an assessment of one or more passengers (e.g., the passenger's overall profile); an assessment of an individual passenger risk profile (e.g., one passenger may be cautious and be more risk-adverse than another passenger); an assessment of whether the SDV is stopped at the proper location; an assessment of which door should be unlocked (e.g. a door next to the curb is unlocked (not a door facing traffic)); an assessment that the door can be unlocked when a signal is received from a portable device, optionally controlled by a third party that is "within range" of the parked car. For example, in this last assessment, the authorization to unlock the doors of the SDV may expire after N minutes. In an embodiment, the passengers and their assessments are weighted. For example, the state of one passenger in the SDV may be predetermined to have a greater influence on whether or not to lock/unlock the doors/windows/etc. on the SDV over the state of another passenger in the SDV.

Communications channels between smartphones and SDVs (or SDV lock modules) may be used to control or provide information to the lock and the phone. Information may flow both ways.

For example, in the event of an accident, the doors may unlock automatically, and a computer-generated voice instruct the passengers on the best way to exit (e.g., given the location and extent of the damage, potential for fire, and surroundings).

In an embodiment of the present invention, assume that electromechanical mechanisms on the SDV open/close the doors on the SDV. These electromechanical mechanisms are variably controlled, such that the speed of the door opening (and related properties) may further be adjusted based on who needs to exit the vehicle (e.g., persons with certain mobility issues) and weather conditions outside (e.g., do not open the doors very fast if there is snow/hail/etc.).

In an embodiment of the present invention one or more SDV doors may unlock as an authorized rider approaches (e.g., an SDV taxi that has contracted to take a person to a destination). The SDV can authenticate the user (or the user's client computing device) before unlocking the vehicle's doors and allowing the user to enter. These and other context parameters may also be used to arrive at a joint decision to lock or unlock. In an embodiment of the present invention, a dispatching system, via a server computing device such as monitoring system 201 shown in FIG. 2), may provide the client computing device (e.g., a smart phone carried by a potential passenger) and the SDV 202 with a pair of encryption keys for authentication before unlocking the SDV 202.

Conversely, one or more SDV doors may lock, even in the presence of an authorized rider, if an unauthorized person approaches the SDV. For example, sensors on the SDV may determine than an unauthorized person is pulling the handle of a passenger door, attempting to open the trunk, pushing or knocking at the window, utilizing a tool to force a lock open, etc., which may indicate an attempt at theft of the SDV. In one or more embodiments, an unauthorized person may be the only person near the SDV, thus causing the SDV to keep all lockable areas (doors, trunk, hatch, etc.) locked. In another embodiment, an authorized rider and an unauthorized person may both be near/approaching the SDV. In this embodiment, the SDV may selectively unlock only a door nearest to the authorized rider, while keeping all other doors locked.

In an embodiment of the present invention, the SDV on-board computer will have a failsafe setting, so that if something "goes wrong" with the lock/unlock module, the passenger may select an option on her phone to unlock the vehicle. Similarly, a message may be relayed to a customer support representative and/or the server computing device, which may unlock the doors.

In an embodiment of the present invention, another SDV (e.g., SDV 206 shown in FIG. 2) and or an aerial drone (not shown) may assist in deciding whether to lock or unlock locks on SDV 202. For example, assume that SDV 206 is traveling ahead of SDV 202 along roadway 204 when SDV 206 detects a broken guardrail on roadway 204. If SDV 202 were to travel through the broken guardrail, it would be advantageous if all locks (door locks, glove compartment locks, trunk locks, etc.) were to be locked, in order to protect the structural integrity of the SDV 202 (e.g., as provided by the locked doors, trunk, hood) as well as to prevent items from flying about the cabin of the SDV 202 (as provided by locking the glove compartment in the cabin of the SDV 202). As such, SDV 206 may send an instruction to the SDV on-board computer 301 within SDV 202 to lock such locks.

Similarly, if sensors detect that the SDV 202 and/or SDV 206 are experiencing (or have been warned by a smart sign, etc.) a severe/sharp turn (i.e., a hairpin turn) experience, a message may be generated (e.g., from the SDV on-board computer 301 within the SDV 202 and/or the SDV 206) to trigger a door to lock (e.g. if the door is unlocked while a car is driving).

In an embodiment of the present invention, a dangerous animal alert may trigger one or more doors to lock (e.g., if the door is unlocked). For example, assume that a dangerous animal (e.g., an unpredictable pet animal) is being transported within SDV 202 to its owner. As such, the system would not want an unwary person to open the door to SDV 202, and will keep the doors locked until the SDV 202 reaches the location of the owner of the pet.

Similarly, if danger is detected outside of SDV 202 (e.g., a bear or other large animal), then the SDV on-board computer 301 will direct all door and window locks to remain locked while SDV 202 is in the presence of the bear or other large animal.

In an embodiment of the present invention, SDV lock modules (e.g., SDV on-board computers 301 and their associated lock control mechanisms 341) communicate among themselves in order to coordinate the timing of locks/unlocks. For example, multiple SDVs may have their doors locked or unlocked at the same or different times, in order to coordinate the discharge of their passengers at the same time (or at staggered times), in order to affect a smooth and coordinated discharge of many passengers at a single location.

In one embodiment, all of the SDV doors automatically lock when the vehicle starts to move and all of the doors automatically unlock when the SDV reaches its destination and the SDV is stopped.

For multi-occupancy vehicles techniques, Noise-Tolerant Time Varying Graphs can be employed to predict behavior of the occupants (it may often depend on the social/group dynamics), taking into account personal interactions, need to gather personal belongings, etc. upon exiting/entering the vehicle. Such information may be used to predict and control the timing of the door opening and closing. Passengers may further provide feedback on the speed of opening in different conditions, thereby taking part in the active learning component of the system, which fine tunes the operations based on user's input.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
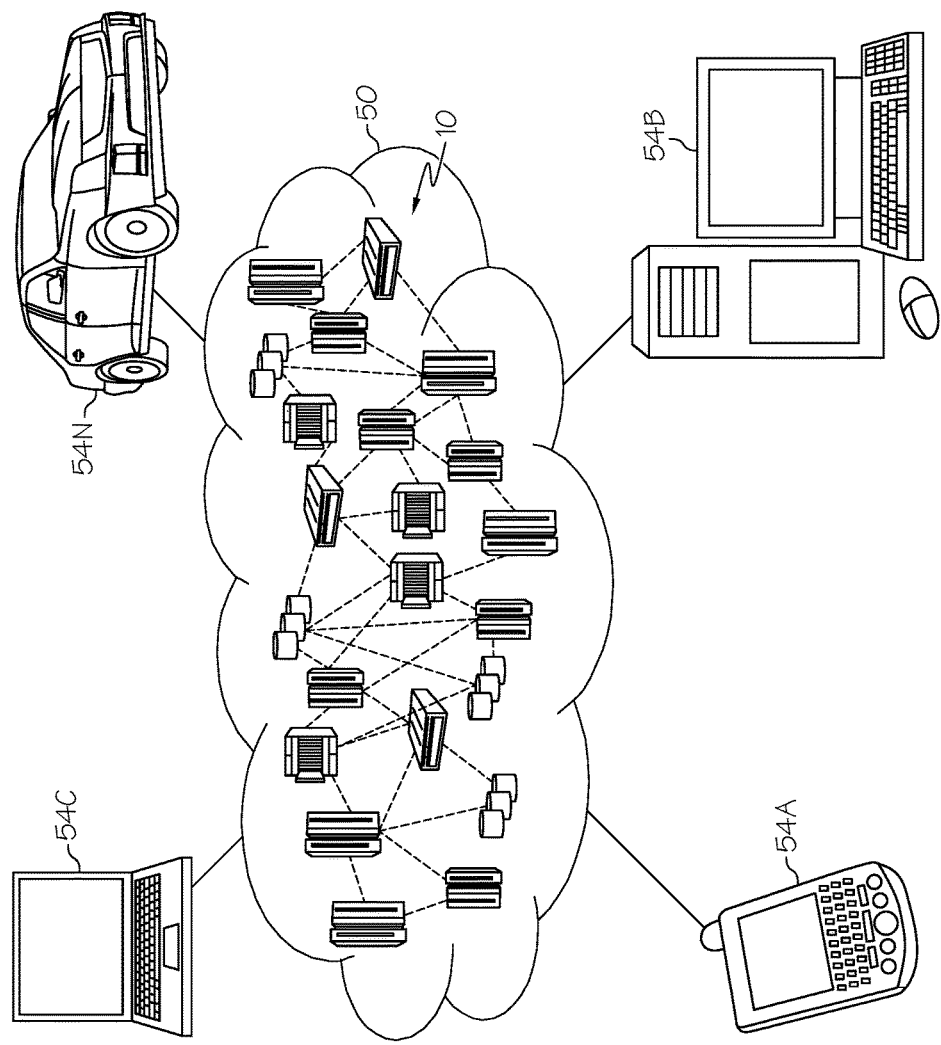
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
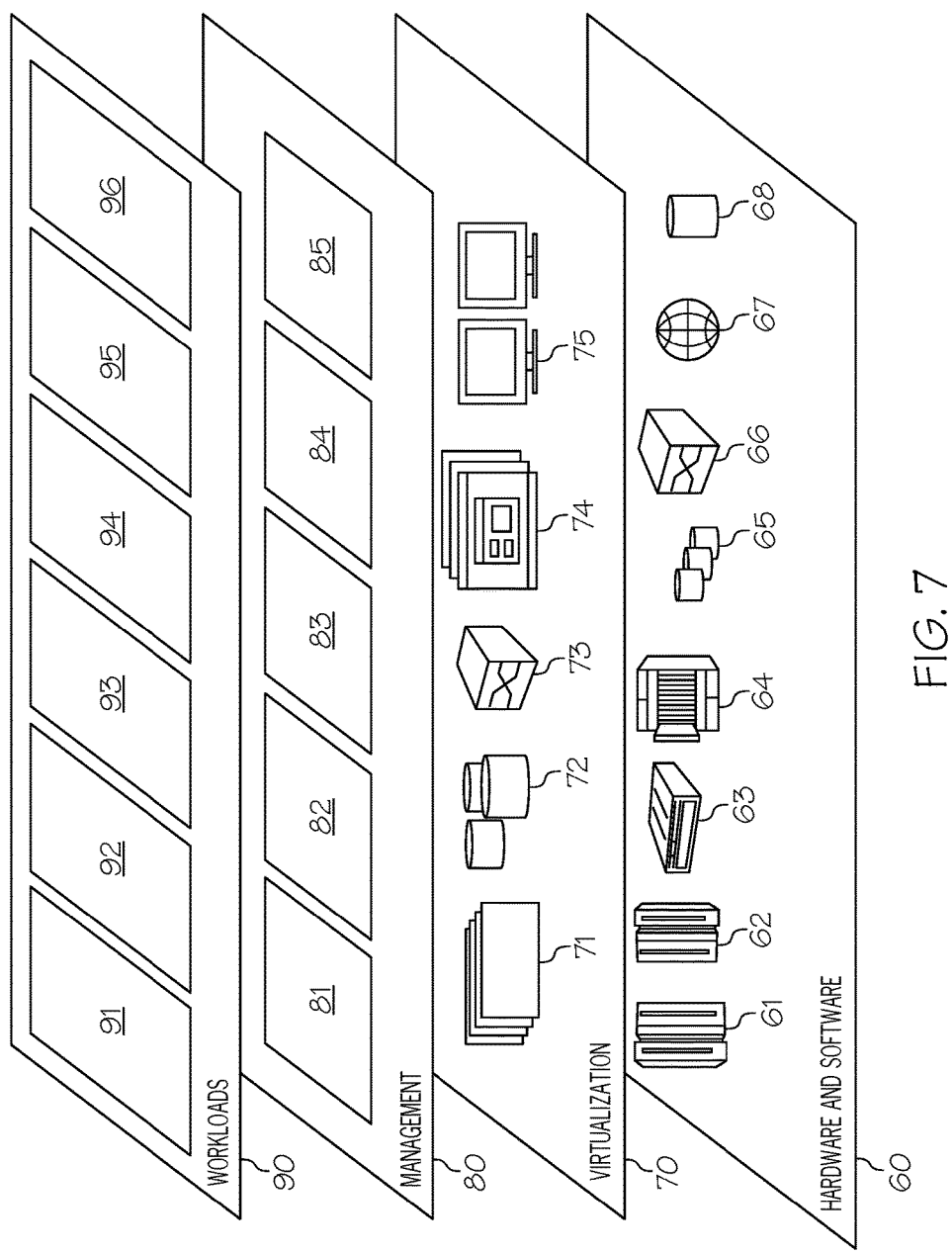
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SDV lock control processing 96 in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
receiving, by one or more processors, sensor readings from sensors on a self-driving vehicle (SDV) that describe a vehicle context assessment of the SDV and a passenger context assessment of a passenger in the SDV; and
transmitting, by one or more processors, a signal to a lock controller mechanism in the SDV to selectively lock or unlock a lock in the SDV based on the vehicle context assessment and the passenger context assessment;
directing the lock controller mechanism to, prior to locking or unlocking the door, request passenger confirmation from the passenger in the SDV; and
in response to receipt of the passenger confirmation from the passenger in the SDV, directing the lock controller mechanism to lock or unlock the lock in the SDV.

2. The computer-implemented method of claim 1, wherein the lock controller mechanism in the SDV selectively locks and unlocks SDV components from a group consisting of a passenger door on the SDV, a trunk door on the SDV, a glove compartment door in the SDV, a hatchback door on the SDV, and a hood of the SDV.

3. The computer-implemented method of claim 1, wherein the passenger context assessment is based on a risk aversion profile for the passenger in the SDV, wherein the risk aversion profile describes a psychological fear of the passenger.

4. The computer-implemented method of claim 1, wherein the passenger context assessment is based on a risk profile for the passenger in the SDV, wherein the risk profile describes a physiological condition of the passenger.

5. The computer-implemented method of claim 1, wherein the vehicle context assessment is based on a current degree of movement and location of the SDV.

6. The computer-implemented method of claim 1, wherein the signal to the lock controller mechanism is received from a remote device that has been predetermined to be authorized to lock and unlock the lock in the SDV based on an identity and state of the passenger in the SDV.

7. The computer-implemented method of claim 1, further comprising:
  detecting, by one or more processors, that the SDV has been involved in a collision;
  in response to detecting that the SDV has been involved in the collision, one or more processors directing the lock in the SDV to unlock; and
  in response to detecting that the SDV has been involved in the collision, one or more processors generating an audible set of directions to the passenger of the SDV for exiting the SDV.

8. The computer-implemented method of claim 1, wherein the method is implemented as a cloud-based service.

9. A non-transitory computer program product for selectively locking and unlocking locks in a self-driving vehicle (SDV), the non-transitory computer program product comprising a computer readable storage medium having program instructions embodied therewith, the program instructions readable and executable by a processor to cause the processor to perform a method comprising:
  receive sensor readings from sensors on the self-driving vehicle (SDV) that describe a vehicle context assessment of the SDV and a passenger context assessment of a passenger in the SDV;
  transmit a signal to a lock controller mechanism in the SDV to selectively lock or unlock a lock in the SDV based on the vehicle context assessment;
  direct the lock controller mechanism to, prior to locking or unlocking the door, request passenger confirmation from the passenger in the SDV; and
  upon receipt of the passenger confirmation from the passenger in the SDV, direct the lock controller mechanism to lock or unlock the lock in the SDV.

10. The non-transitory computer program product of claim 9, wherein the lock controller mechanism in the SDV selectively locks and unlocks SDV components from a group consisting of a passenger door on the SDV, a trunk door on the SDV, a glove compartment door in the SDV, a hatchback door on the SDV, and a hood of the SDV.

11. The non-transitory computer program product of claim 9, wherein the passenger context assessment is based on a risk aversion profile for the passenger in the SDV, wherein the risk aversion profile describes a psychological fear of the passenger.

12. The non-transitory computer program product of claim 9, wherein the passenger context assessment is based on a risk profile for the passenger in the SDV, wherein the risk profile describes a physiological condition of the passenger.

13. The non-transitory computer program product of claim 9, wherein the vehicle context assessment is based on a current degree of movement and location of the SDV.

14. The non-transitory computer program product of claim 9, wherein the signal to the lock controller mechanism is received from a remote device that has been predetermined to be authorized to lock and unlock the locks in the SDV based on an identity and state of the passenger in the SDV.

15. The non-transitory computer program product of claim 9, wherein the method further comprises:
  detecting that the SDV has been involved in a collision;
  in response to detecting that the SDV has been involved in the collision, directing the locks in the SDV to unlock; and
  in response to detecting that the SDV has been involved in the collision, generating an audible set of directions to the passenger of the SDV for exiting the SDV.

16. The non-transitory computer program product of claim 9, wherein the program instructions are provided as a service in a cloud environment.

17. A system comprising:
  one or more processors;
  one or more computer readable memories operably coupled to the one or more processors;
  one or more computer readable storage mediums operably coupled to the one or more computer readable memories; and
  program instructions stored on at least one of the one or more computer readable storage mediums for execution by at least one of the one or more processors via at least one of the one or more computer readable memories, the program instructions comprising:
  program instructions configured to receive sensor readings from sensors on a self-driving vehicle (SDV) that describe a vehicle context assessment of the SDV and a passenger context assessment of a passenger in the SDV;
  program instructions configured to transmit a signal to a lock controller mechanism in the SDV to selectively lock or unlock a lock in the SDV based on the passenger context assessment;
  program instructions configured to direct the lock controller mechanism to, prior to locking or unlocking the door, request passenger confirmation from the passenger in the SDV; and
  program instructions configured to, upon receipt of the passenger confirmation from the passenger in the SDV, direct the lock controller mechanism to lock or unlock the lock in the SDV.

18. The system of claim 17, wherein the lock controller mechanism in the SDV selectively locks and unlocks SDV components from a group consisting of a passenger door on the SDV, a trunk door on the SDV, a glove compartment door in the SDV, a hatchback door on the SDV, and a hood of the SDV.

19. The system of claim 17, further comprising:
  program instructions configured to detect that the SDV has been involved in a collision;
  program instructions configured to, in response to detecting that the SDV has been involved in the collision, direct the lock in the SDV to unlock; and
  program instructions configured to, in response to detecting that the SDV has been involved in the collision, generate an audible set of directions to the passenger of the SDV for exiting the SDV.

* * * * *